Patented Feb. 10, 1948

2,435,829

UNITED STATES PATENT OFFICE 2,435,829

ALPHA-HYDROXY-ETHER OF FATTY ACID SOAP

Herbert H. Guest, West Hartford, Conn., assignor to The J. B. Williams Company, Glastonbury, Conn., a corporation of Connecticut No Drawing. Application November 13, 1944, Serial No. 563,312

15 Claims. (Cl. 260—413)

This invention relates to new chemical compounds or soaps, which are suitable for use as detergents and wetting agents, and to new and improved shaving and cosmetic preparations incorporating the new chemical compounds. More particularly, this invention is directed to the soaps of the novel α-substituted higher fatty acids described in my copending application Ser. No. 556,083, of which the present application is a continuation-in-part, and to new and improved shaving creams, shaving soaps and cosmetic preparations incorporating these compounds.

In my copending application I have described and claimed certain novel alkanol-ether acids comprising saturated higher fatty acids of the $C_{12}$ to $C_{18}$ group containing an aliphatic substituent having at least one hydroxyl in the alpha position to the carboxyl group of the acid. Such acids may be prepared by reacting an α-halo higher fatty acid, or an ester or salt thereof, with an alkali metal derivative of a polyhydric alcohol such as a glycol or glycerol, and acidifying the resulting reaction mixture. In this way there are prepared new chemical compounds which are acids of the $C_{12}$ to $C_{18}$ group, more particularly those acids having an even number of carbon atoms such as lauric acid, myristic acid, palmitic acid and stearic acid, containing in the alpha position to the carboxyl group the residue from the polyhydric alcohol attached through the oxygen atom of one of its hydroxyls.

Typical new chemical compounds prepared in accordance with the process disclosed in my copending application include α-(2,3-propanediol-1-ether) octadecanoic acid (also called α-glyceryl stearic acid); α-(2-ethanol-1-ether) octadecanoic acid (also called α-ethylene glycol stearic acid); α-(propane-2-ol-ether) octadecanoic acid (also called α-propylene glycol stearic acid); α-(1,3-dimethyl-3-hydroxy-1-ether butane) octadecanoic acid; and the corresponding derivatives of the other $C_{12}$ to $C_{18}$ higher saturated fatty acids, more especially the derivatives of such acids as dodecanoic acid (lauric acid); tetradecanoic acid (myristic acid); and hexadecanoic acid (palmitic acid). The polyhydric alcohol whose alkali metal derivative is reacted with the α-halo higher fatty acid or its salt or ester may be a glycol or substituted glycol, such as ethylene glycol or propylene glycol; glycerol; or a polyhydric alcohol wherein the hydroxyl groups are not on adjacent carbon atoms, or not on terminal carbon atoms, such as 2-methyl-2,4-pentanediol.

I have found that the soaps of the acids disclosed in my copending application, particularly the alkali metal, and alkanolamine salts thereof, possess very valuable properties as a result of their high solubility in water. Those of the $C_{16}$ and $C_{18}$ acids are especially desirable, since they are readily soluble even in sea water or hard waters of a high degree of hardness. They are rapid foam producing, and form a lather which holds much more water than the lather of soaps made by saponifying coconut acids. They also possess the much sought property of being mild or bland in feeling when applied to the face or skin. They have improved emollient and hair-softening properties, and do not dry on the skin, as do the soaps of the coconut group (Palmae) now generally used. Moreover my new soaps are soluble enough not to form jelly-like soaps. They are especially valuable for use in shaving creams, shaving soaps, and cosmetic preparations requiring a softening or emulsifying agent, since they do not possess the skin-irritant effects characteristic of the coco soaps formed from the lower molecular weight fatty acids which make up the bulk of the coconut oils used in preparing the usual commercial toilet soaps and shaving creams or soaps.

In preparing the improved soaps to which this invention is directed, I may proceed with the preparation of the α-substituted acids as disclosed in my co-pending application, and, after separation of the acid, neutralize the same with the base selected, thereby producing the desired soap. While this method is especially useful for preparing the alkanolamine soaps, since it is not possible to prepare them by the process described in my co-pending application starting with the α-halogen acids of their salts or esters, as undesired amino compounds are formed under these conditions, it is ordinarily unnecessary in the preparation of other soaps to first prepare the acid and then neutralize it with the base to form the soap. By following the process described and claimed in my copending application, omitting the final acidification step, but removing the salt formed as one of the products of reaction, it is possible to prepare soaps of sufficient purity to permit their incorporation in such preparations as shaving soaps and creams without the necessity of first going through the stage in which the α-substituted acid is prepared in relatively pure form.

Accordingly, in preparing such compounds as the alkali metal soaps of the novel α-substituted acids described in my copending application, whether those soaps be common alkali metal soaps, such as sodium or potassium soaps, or the less common alkali metal soaps, such as the lithium soaps, for example, I may react any of the α-halo higher fatty acids referred to in my copending application, or salts or esters thereof, with the alkali metal derivative corresponding to the soap desired of any of the polyhydric alcohols mentioned in that application. Instead of acidifying the reaction mixture to produce the acid, the resulting paste or jelly may be treated to remove the salt formed as one of the products of the reaction. This may be done by simply allowing the salt to settle out, or it may be expedited by dissolving the soap in alcohol, filtering to remove the salt, and then driving off the alcohol by distillation. The purified soap may then be incorporated with or mixed with other ingredients usual in toilet soaps, shaving creams, shaving soaps, or those cosmetic preparations which contain wetting or emulsifying agents.

In some cases where a very pure soap is wanted it is desirable first to prepare the free α-substituted acid having the residue of the polyhydric alcohol in the alpha position to the carboxyl group, and then react the alkali metal or amine base therewith. Generally in preparing the alkanolamine soaps this method is utilized as in this way it is possible to avoid the undesired side reaction wherein undesired amino compounds are formed.

As examples of my process for producing the new soaps of very soluble and free lathering characteristics, greater emollient and hair-softening properties, and a mild or bland feeling on the skin, the following may be given as illustrative:

EXAMPLE 1

SOAPS OF α-GLYCERYL STEARIC ACID

Glycerol in the amount of 200 grams was dehydrated by distilling it with 100 grams of xylene, first at atmospheric pressure, and then under reduced pressure, until all the water and hydrocarbon were removed, including a small amount of glycerol. At the same time sodium ethylate was prepared by dissolving 5 grams of sodium in 100 grams of absolute ethanol. This solution was added to the anhydrous glycerol, and ethanol distilled off. There was thus obtained a solution of sodium glycerinate in glycerol.

The methyl ester of alpha-bromostearic acid in the amount of 45 grams was dissolved in 50 grams of xylene and the resulting solution added to the solution of sodium glycerinate in glycerol. The mixture was subjected to mechanical stirring, and heated to the reflux temperature in a reflux column for one-half hour. At the end of this time the ester had reacted with the alkali metal glycerinate to form sodium α-glyceryl stearate, methanol, and sodium bromide.

The resulting paste comprising the sodium soap of α-glyceryl stearate, also termed the sodium soap of α-(2,3, propanediol-1-ether) octadecanoic acid, could be used as such for some toilet soaps, shaving creams, shaving soaps, cosmetic preparations or similar preparations if the impurity present therein is not objectionable. Preferably, it is first freed from sodium bromide either by settling, or by dissolving in ethanol, filtering to remove the metal salt, and then distilling off the alcohol to yield a relatively pure soap.

If soaps of other bases are desired, the unpurified reaction mixture may be acidified to secure the α-substituted acid, in accordance with the process described in my copending application. The pure acid may be recovered, and then neutralized by the addition of any base to form the corresponding soap. Thus, caustic soda could be used in the neutralization to form a sodium soap; potassium hydroxide to form a potassium soap, or an alkanolamine such as mono, di, or triethanolamine to form the corresponding alkylol amine soaps.

EXAMPLE 2

SOAPS OF α-ETHYLENE GLYCOL STEARIC ACID

A sodium derivative of glycol was prepared by adding 4.7 grams of metallic sodium to 280 grams of substantially anhydrous ethylene glycol. To this solution there was then added 25 grams of the methyl ester of α-chlorostearic acid. The mixture was heated to the reflux temperature and refluxed for approximately one hour.

The resulting reaction mixture was filtered to separate the precipitated sodium chloride, and then distilled under a reduced pressure less than atmospheric to remove excess glycol. The resulting pasty product was the sodium soap of α-ethylene glycol stearic acid, also termed α-(2-ethanol-1-ether) octadecanoic acid. It may be incorporated in shaving creams and soaps, toilet soaps, and cosmetic preparations.

Should it be desired to prepare substantially pure soaps of other bases, the substantially pure acid may first be prepared by acidifying the reaction mixture and separated as disclosed in my copending application. This substantially pure acid may then be neutralized by the addition of any alkali metal base, or alkanolamine base, to form the corresponding soaps of the α-substituted fatty acid.

EXAMPLE 3

SOAPS OF α-PROPYLENE GLYCOL STEARIC ACID

The sodium derivative of propylene glycol was prepared by adding 6.5 grams of metallic sodium in small amounts to 210 grams of propylene glycol. The solution was then added to 50 grams of α-bromostearic acid dissolved in 50 grams of benzene. The reactants were stirred and the reaction was complete in one-half hour, the temperature not exceeding 100° C. Excess glycol was then removed by distillation of the reaction mixture under a pressure less than atmospheric.

The pasty material was essentially the sodium soap of α-propylene glycol, which may be also named the sodium soap of α-(propane-2-ol-1-ether) octadecanoic acid. It could be used without purification in some shaving and cosmetic preparations, or in toilet soaps, but is advantageously freed of sodium bromide by dissolving in ethanol and filtering. By distilling off the alcohol the substantially pure soap is obtained.

Instead of purifying it to free it of sodium bromide the reaction product might be converted to the corresponding acid by acidification as described in my copending application. The substantially pure acid may then be separated, and neutralized, or substantially neutralized, with any alkali metal base, or alkanolamine base, to form the corresponding soaps of the α-substituted fatty acid in substantially pure form.

EXAMPLE 4

SOAPS OF α-GLYCERYL PALMITIC ACID

The sodium derivative of glycerol was first prepared. 380 grams of glycerol was dehydrated by distilling it with 100 grams of xylene, first at atmospheric pressure, and then at reduced pressure less than atmospheric. A solution of sodium ethylate was prepared from 10 grams of sodium and 200 grams of ethanol. This was added to the dehydrated glycerol and excess ethanol distilled off, thereby resulting in a solution of sodium glycerinate in glycerol.

Fifty grams of α-bromopalmitic acid were added to the sodium glycerinate, and the mixture heated to 100° C. for one-half hour, at the end of which time the reaction was complete. The resulting product, comprising the sodium salt of α-glyceryl palmitic acid, also termed α-(2,3-propanediol-1-ether) hexadecanoic acid, may be used as such in some toilet soaps or shaving or cosmetic preparations. However, it is preferable to first free it from sodium bromide by dissolving in ethanol, filtering, and distilling off the alcohol.

If soaps other than the sodium soap are desired, or if an extremely pure sodium soap should be needed for any special purpose, the reaction mixture may be converted to the corresponding α-substituted acid, as described in my copending application, and this acid then neutralized or substantially neutralized, with the particular alkali metal base, or alkanolamine base whose soap is desired.

EXAMPLE 5

SOAPS OF α-PROPYLENE GLYCOL MYRISTIC ACID

Sodium soap

Seven grams of metallic sodium were dissolved in a mixture of 100 grams of absolute ethanol and 100 grams of propylene glycol. Excess alcohol was distilled off and distillation continued until a small amount (10 grams) of the glycol had also been distilled over. The distillation was first carried out at atmospheric pressure, and then under reduced pressure in a partial vacuum.

After the solution of the sodium derivative of propylene glycol thus produced had cooled, it was added to a flask containing 40 grams of methyl α-bromomyristate. The resulting reaction mixture was heated for half an hour at 100° C. until the reaction was complete.

The resulting sodium soap of α-propylene glycol myristic acid, also termed α-(propane-2-ol-1-ether) tetradecanoic acid, could be utilized without purification in certain shaving and cosmetic preparations and in toilet soaps. However it is preferably first freed of sodium bromide by dissolving in ethanol and filtering. After distilling off the alcohol it is secured in a pure state.

If soaps other than the sodium soap are desired, the acid may be prepared by acidification as described in my copending application, and this acid then neutralized or substantially neutralized by the base corresponding to the soap desired. This base may be an alkali metal base, such as sodium hydroxide, potassium hydroxide or lithium hydroxide, or an ethanolamine base.

Potassium soap

Propylene glycol in the amount of 100 grams was added to a solution of 15 grams of solid potassium hydrate (KOH) in 100 grams of absolute alcohol, and the mixture distilled, first at atmospheric pressure, and then under reduced pressure less than atmospheric, until 110 grams of the mixed alcohol and glycol had been distilled off from the mixture.

The resulting potassium derivative of propylene glycol was mixed with 30 grams of methyl α-bromomyristate and the mixture heated at 100° C. for one-half hour.

The resulting potassium soap of α-propylene glycol myristic acid, also termed α-(propane-2-ol-1-ether) tetradecanoic acid, may be utilized as such, or it might be freed of potassium bromide by dissolving in ethanol and filtering. Upon distilling off the alcohol the substantially pure soap is secured.

In accordance with the process of my copending application the reaction product could be converted to the free acid, which may then be neutralized with any desired base to produce salts corresponding to the base. In this way there are produced substantially pure alkali metal, and alkanolamine soaps.

EXAMPLE 6

SOAPS OF α-GLYCERYL STEARIC ACID

Solid potassium hydroxide pellets in the amount of 15 grams were dissolved in 100 grams of absolute ethanol by heating under a reflux condenser. Glycerol in the amount of 150 grams, which had previously been heated to 210° C. for a short time in order to render it substantially anhydrous, was then added to the alcohol solution. The resulting mixture was then distilled, first at atmospheric pressure and then under partial vacuum until glycerol began to appear in the distillate.

The resulting potassium glycerinate solution was then cooled and mixed, with mechanical stirring, with 30 grams of methyl α-bromostearate. The resulting mixture was heated to 130° C. for one-half hour.

The resulting reaction mixture containing the potassium soap of α-glyceryl stearic acid, also termed α-(2,3 propanediol-1-ether) octadecanoic acid, could be utilized directly in some toilet and shaving preparations. It is first preferably freed of potassium bromide by dissolving in ethanol, filtering, and evaporation of the alcohol to give the pure soap.

If soaps other than the potash soap are desired, the substantially pure acid may be prepared by acidification of the reaction mixture in accordance with the method disclosed in my copending application, and this acid neutralized with a base to produce the desired soap. Any of the previously specified bases may be utilized, or, if alkaline earth metal soaps should be desired for any reason (although not utilizable as soluble soaps), the bases of the alkaline earth metals, such as calcium hydroxide and barium hydroxide, may be used to effect the neutralization.

EXAMPLE 7

SOAPS OF α-PROPYLENE GLYCOL LAURIC ACID

Fifteen grams of solid potassium hydroxide were dissolved in 50 grams of absolute ethanol by heating. To the resulting solution 100 grams of propylene glycol were added, and the mixture distilled, first at atmospheric pressure, and then at a pressure less than atmospheric. Distillation was continued until 70 grams of unreacted ethanol and glycol were distilled over.

The resulting solution of the potassium derivative of propylene glycol was cooled and then added to 25 grams of methyl α-chlorolaurate with mechanical stirring. The resulting reaction mixture was heated to 150° C. for 25 minutes until reaction was complete.

The resulting potassium soap of α-propylene glycol lauric acid, also termed α-(propane-2-ol-1-ether) dodecanoic acid, is preferably freed of potassium chloride by dissolving in ethanol, filtering, and distilling off the alcohol. This gives the pure soap for incorporation in shaving creams or soaps, or in cosmetic preparations.

Should soaps other than the potash soap be desired, the reaction mixture may be converted to the free acid by acidification in accordance with the method of my copending application, and the resulting, substantially pure, free acid neutralized, or substantially neutralized, with any of the bases previously referred to to produce the desired soaps.

EXAMPLE 8

SOAPS OF α-(1,3 DIMETHYL-3-HYDROXY-1-ETHER BUTANE)-OCTADECANOIC ACID

Anhydrous ethanol in the amount of 100 grams was reacted with five grams of metallic sodium. After all the sodium had dissolved, 110 grams of 2-methyl-2,4 pentanediol were added, and the mixture subjected to distillation, first at atmospheric pressure, and then under reduced pressure less than atmospheric. The distillation was continued until approximately 103 grams of unreacted ethanol and alcohol were distilled over. This resulted in a solution of the sodium derivative of 2-methyl-2,4-pentanediol.

This solution was then added to 30 grams of α-bromostearic acid and the reaction mixture heated for one hour at 100° C. The resulting sodium soap of α-(1,3 dimethyl-3-hydroxy-1-ether butane)-octadecanoic acid when then freed of sodium bromide by dissolving in ehtanol, filtering, and distilling off the alcohol. This gives the pure soap for incorporation in shaving creams, shaving soaps, cosmetic preparations, toilet soap, etc.

However, if substantially pure soaps of other bases are desired, the free acid may be prepared by acidification of the unpurified reaction mixture, in accordance with the process of my copending application, and this acid neutralized with any alkali, or with an ethanolamine base to produce the desired soaps in the substantially pure state.

EXAMPLE 9

ALKANOLAMINE SOAPS OF α-GLYCERYL STEARIC ACID

Fifty grams of α-glyceryl stearic acid, also called α-(2,3 propanediol-1-ether) octadecanoic acid, prepared as described in my copending application, were melted and mixed with 10 grams of monoethanolamine. This is an excess of the amine of 25% over the theoretical amount. The mixture was stirred to secure complete homogenization. The resulting thick paste was the monoethanolamine soap of α-glyceryl stearic acid. It was readily soluble in water and had good detergent qualities. While it does not foam readily, the soap is a good emulsifying agent.

For identification purposes the soap was heated to 130–150° C. for one hour. It was converted into an amide that was insoluble in water, but was readily soluble in, and could be recrystalized from, ethanol. The amide melted at 113° C. and had the formula:

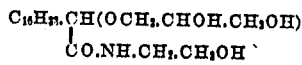

In a similar manner other amine soaps can be prepared from any of the other α-substituted higher fatty acids described and claimed in my copending application. While I have taken the monoethanolamine soap as illustrative, similar soaps can, of course, be prepared by using other alkanolamines such as diethanolamine or triethanolamine. While the soaps may vary somewhat in their lathering properties, all are good emulsifying agents.

EXAMPLE 10

SODIUM SOAP OF α-GLYCERYL STEARIC ACID 100 grams of absolute ethyl alcohol was reacted with 7 grams of metallic sodium, the metal being added gradually to the alcohol. When all of the sodium had dissolved, 100 grams of dehydrated glycerin (100%) was added. The mixture was then distilled in order to completely remove the ethanol. To the residue, which consisted of sodium glycerinate and glycerin, there was added 35 grams of α-chloromethylstearate. The mixture was then heated for one hour at a temperature of 150–170° C.

In order to free the resulting soap from sodium chloride, the reaction mixture was dissolved in ethanol, filtered, and the alcohol then distilled off. The soap could then be used in the preparation of shaving soaps, toilet soaps, and similar preparations.

A typical formula for shaving cream, utilizing the sodium soap of α-glyceryl stearic acid, also called the sodium soap of α-(2,3 propanediol-1-ether) octadecanoic acid, as thus prepared, may be as follows:

| | Per cent |
|---|---|
| Soap | 20 to 40 |
| Stearic acid | 14 to 35 |
| Potassium hydroxide (aqueous solution of 1.5 specific gravity) | 6 to 15 |
| Water | Sufficient to make 100 |

All percentages are by weight, based on the total weight of the shaving cream.

In place of the glycerin, any glycol could be utilized to produce similar soaps which might be employed in the shaving cream formula in place of the sodium soap of α-glyceryl stearic acid. Thus, soaps could be prepared by utilizing propylene glycol, diethylene glycol, ethylene glycol or 2-methyl-2,4 pentanediol in place of the glycerin.

EXAMPLE 11

POTASSIUM SOAP OF α-GLYCERYL STEARIC ACID 25 grams of solid potassium hydroxide was dissolved in 100 grams of absolute ethanol. Dehydrated glycerol in the amount of 100 grams was added, and the ethanol completely removed by distillation.

After cooling, there was added 75 grams of methyl α-bromostearate. The resulting mixture was heated cautiously, with stirring. After one-half hour of heating at 150° C. the reaction was complete.

Ethanol was added to the reaction mixture to dissolve the potassium soap of α-glyceryl stearic acid present therein, and the resulting solution filtered to free it from potassium bromide. The alcohol was then removed by distillation. The resulting substantially pure soap could be used for shaving and cosmetic preparations, or in the manufacture of commercial toilet soaps.

EXAMPLE 12

POTASSIUM SOAP OF α-PROPYLENE GLYCOL LAURIC ACID 15 grams of solid potassium hydroxide was dissolved in 50 grams of absolute ethanol by heating. Propylene glycol in the amount of 100 grams was then added, and the mixture distilled to remove the ethanol.

Methyl α-chlorolaurate in the amount of 25 grams was added to the warm glycol mixture, which was stirred to insure thorough homogenization. After heating at a temperature of 150–160° C. for about one hour, the mixture was filtered to remove potassium chloride. The excess glycol was removed by distillation in vacuum. The resulting potash soap of α-propylene glycol lauric acid was a pasty product, very soluble in water.

EXAMPLE 13

SOAPS OF α-PROPYLENE GLYCOL MYRISTIC ACID

A mixture of 100 grams of absolute ethanol and 100 grams of propylene glycol was reacted with 7 grams of metallic sodium. After the sodium had completely dissolved, the ethanol was removed by distillation.

There was then added 40 grams of methyl α-bromomyristate gradually, with stirring. The reaction mixture was heated at 100° C. for about one-half hour.

The resulting sodium soap of α-propylene glycol myristic acid could be used as formed, or it could be further purified by acidifying the reaction mixture with dilute mineral acid, as for example, with 10% sulfuric acid. This resulted in an oil which was washed and dried on the steam bath. Its analytical values agreed with those calculated for

$CH_3.(CH_2)_{11}.CH(OCH_2.CHOH.CH_3).COOH$

An amine soap of this acid was prepared by adding the calculated amount of triethanolamine necessary to neutralize the acid. The amine soap thus resulting formed a clear jelly at room temperature. It was soluble in hard water and in sea water, as well as in oil and in organic liquids such as benzene.

The sodium salt in very pure form was prepared by neutralizing the acid with the calculated amount of sodium hydroxide. This soap was a paste that was soluble in water, but not in oils. It foams freely even in salt water.

EXAMPLE 14

AMINE SOAPS OF α-GLYCERYL PALMITIC ACID 20 grams of α-glyceryl palmitic acid, prepared in accordance with the process described in my copending application, was neutralized with the calculated amount (6 grams) of 2-amino-2-methyl-1,3-propanediol. There resulted a soft paste, very soluble in water, which possessed excellent wetting properties. The product was the alkanolamine soap of α-glyceryl palmitic acid, and was of considerable value when incorporated in shaving creams and soaps.

EXAMPLE 15

SOAPS OF α-GLYCERYL STEARIC ACID 10 grams of solid potassium hydroxide was dissolved in 35 milliliters of ethanol and 50 milliliters of glycerol. The alcohol was distilled out, and 30 grams of methyl α-bromostearate was gradually added, with stirring. The mixture was heated for one-half hour at a temperature of 140° C. The resulting soapy product was dissolved in 100 milliliters of ethanol and the potassium bromide filtered out. The alcohol was recovered by distillation, leaving a viscous paste, which was the potassium soap of α-glyceryl stearic acid.

The soap was used in making up a shaving cream having the following formula:

| | Parts |
|---|---|
| Potassium soap of α-glyceryl stearic acid | 30 |
| Stearic acid | 30 |
| Potassium hydroxide solution (specific gravity 1.5) | 12 |
| Water | 28 |

All parts are by weight.

The percentage of soap in the shaving cream may be varied within considerable limits to impart any desired degree of foaming to the cream. The potassium soap could also be replaced, either wholly or in part, by the amine soap of α-glyceryl stearic acid, prepared by a process similar to that described in Example 13. The properties of the shaving cream are considerably improved by incorporating up to five parts of the amine soap as part of the total thirty parts of soap, as the wetting effect on the beard is thereby considerably improved.

The soaps prepared in accordance with my invention, including the alkali metal and alkanolamine soaps of the acids described in my copending application, are characterized by certain remarkable properties not found in the soaps of the coconut group (Palmae), which are at present universally used in making commercial soap-containing preparations. In addition, they have the important advantage that they can be prepared from starting materials which are readily available in this country, and which do not have to be imported.

My new soaps yield a free or copious lather in all kinds of water, including the hard waters common to large areas of the United States. They do not have the skin-irritant effects characteristic of the soaps prepared from the lower molecular weight acids making up the bulk of the coconut oils. They are mild or bland in feeling on the face, and have greater emollient and hair-softening properties, since they do not tend to dry as readily as the coconut soaps.

As typical examples of my new soaps I may refer to the sodium soaps of α-propylene glycol myristic acid and α-propylene glycol lauric acid. They are very soluble in water, lathering readily, possessing good detergent action even in sea water.

Among other typical soaps the sodium or potassium soaps of α-glyceryl stearic acid are remarkable for their solubility in water, even water of a high degree of hardness, as contrasted, for example, with sodium stearate which is almost insoluble in cold water.

The alkali metal soaps prepared in accordance with my invention can be readily salted out of solution with sodium hydroxide or sodium chloride. Alkaline earth metal soaps, such as the barium soaps, are readily formed by adding an alkaline earth metal salt, such as a solution of barium chloride, to a solution of the alkali metal soap. The alkaline earth metal soap precipitates out as a solid, which is generally white in color.

My new soluble soaps, constituting the alkali metal, and alkanolamine salts of the α-substituted higher fatty acids described and claimed in my copending application, may be represented generically by the formula:

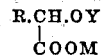

$$R.CH.OY$$
$$|$$
$$COOM$$

where R is an alkyl radical containing at least 10 carbon atoms; Y a polyhydric alcohol residue;

and M an alkali metal or alkanolamine residue. Since I am particularly concerned with the α-substituted acids having an even number of carbon atoms of the saturated series extending from lauric acid to stearic acid, R is preferably an alkyl radical selected from the group which consists of decyl, dodecyl, tetradecyl, and hexadecyl.

Since the α-substituted higher fatty acid is joined through an ether linkage with the polyhydric alcohol residue substituent in the alpha position, my new soaps may also be represented by the following generic formula:

$$\underset{\text{COOM}}{\text{R.CH.OCH.Q}}\overset{\text{S}}{|}$$

where R is an alkyl radical containing at least 10 carbon atoms; S is a radical selected from the group which consists of hydrogen and alkyl radicals; Q is a substituted aliphatic group containing at least one hydroxyl substituent; and M denotes a salt-forming radical, such as an alkali metal, an alkaline earth metal, or an alkanolamine residue. For water-soluble soaps M may represent an alkali metal, or an alkanolamine residue.

My invention is particularly applicable to preparing mixed soaps of α-substituted palmitic and stearic acids having the polyhydric alcohol residue attached in the alpha position to the carboxyl group, such as result when derivatives of the stearic acid of commerce is employed in preparing the soaps. The stearic acid of commerce is a mixture of palmitic and stearic acid, and the mixture of soaps resulting is utilizable for any purpose in preparing shaving creams, shaving soaps, cosmetic preparations, toilet soaps, or other compositions requiring a highly soluble soap product possessing good detergent properties, exactly as if it were a pure product instead of a mixture.

The foregoing description and examples are intended merely to be illustrative of certain preferred embodiments of my invention. Modifications thereof which conform to the spirit of the invention, or variations therefrom, as they may be within the scope of the appended claims, are to be considered as part of my invention.

I claim:

1. A water-soluble soap of an α-substituted higher fatty acid having the formula:

$$\underset{\text{COOM}}{\text{R.CH.OY}}$$

where R is an alkyl radical containing at least ten carbon atoms; Y is a monovalent, simple functional, saturated, aliphatic, polyhydric alcohol residue, said residue containing less than three hydroxyl groups, and M is a salt-forming radical selected from the group which consists of the alkali metals and alkanolamines.

2. A water-soluble soap of an α-substituted higher fatty acid having the formula:

$$\underset{\text{COOM}}{\text{R.CH.OCH}_2\text{.CH}_2\text{OH}}$$

where R is an alkyl radical having an even number, from ten to sixteen inclusive, of carbon atoms; and M is an alkali metal.

3. A water-soluble soap of an α-substituted higher fatty acid having the formula:

$$\underset{\text{COOM}}{\text{R.CH.OCH}_2\text{.CHOH.CH}_2\text{OH}}$$

where R is an alkyl radical having an even number, from ten to sixteen inclusive, of carbon atoms; and M is an alkali metal.

4. Sodium α-(2,3 propanediol-1-ether) octadecanoicate.

5. Sodium α-(2-ethanol-1-ether) octadecanoicate.

6. The method of producing a water-soluble alkali metal soap of an α-substituted higher fatty acid which comprises reacting an alkali metal derivative of a simple functional, saturated, aliphatic, polyhydric alcohol having less than four hydroxyl groups with a compound selected from the group which consists of the saturated α-halogen substituted higher fatty acids having twelve to eighteen carbon atoms, and their salts and esters.

7. The method of producing a soluble alkali metal soap of an α-substituted higher fatty acid, which comprises reacting an alkali metal derivative of a simple functional, saturated, aliphatic, polyhydric alcohol having less than seven carbon atoms and less than four hydroxyl groups with a saturated α-halogen substituted higher fatty acid having twelve to eighteen carbon atoms.

8. A water-soluble soap of an α-substituted higher fatty acid having the formula:

$$\underset{\text{COOM}}{\text{R.CH.OY}}$$

where R is an alkyl radical containing at least ten carbon atoms; and Y is a simple functional, saturated, aliphatic, polyhydric alcohol residue, said residue containing less than seven carbon atoms and less than three hydroxyl groups, and M is an alkali metal.

9. A water-soluble soap of an α-substituted higher fatty acid having the formula:

$$\underset{\text{COOM}}{\text{R.CH.OY}}$$

where R is an alkyl radical containing at least ten carbon atoms; and Y is a simple functional saturated, aliphatic, polyhydric alcohol residue, said residue containing less than four carbon atoms and less than three hydroxyl groups, and M is an alkali metal.

10. A lather-forming preparation adapted for shaving which includes, as a lather-forming constituent thereof, a water-soluble soap of a α-substituted higher fatty acid having the formula:

$$\underset{\text{COOH}}{\text{R.CH.OY}}$$

where R is an alkyl radical containing at least ten carbon atoms, and Y is a simple functional, saturated, aliphatic, polyhydric alcohol residue, said residue containing less than three hydroxyl groups.

11. A lather-forming preparation adapted for shaving which includes, as a lather-forming constituent thereof, a water-soluble alkali metal soap of an α-substituted higher fatty acid having the formula:

$$\underset{\text{COOH}}{\text{R.CH.OY}}$$

where R is an alkyl radical containing at least ten carbon atoms, and Y is a simple functional, saturated, aliphatic, polyhydric alcohol residue, said residue containing less than four carbon atoms and less than three hydroxyl groups.

12. A lather-forming preparation adapted for shaving which includes, as a lather-forming constituent thereof, a water-soluble alkanolamine soap of an α-substituted higher fatty acid having the formula:

$$R.CH.OY$$
$$|$$
$$COOH$$

where R is an alkyl radical containing at least ten carbon atoms, and Y is a simple functional, saturated, aliphatic, polyhydric alcohol residue, said residue containing less than four carbon atoms and less than three hydroxyl groups.

13. The method of producing a water-soluble alkanolamine salt of an α-substituted higher fatty acid which comprises reacting an α-substituted higher fatty acid having the formula:

$$R.CH.OY$$
$$|$$
$$COOH$$

where R is an alkyl radical containing at least ten carbon atoms, and Y is a simple functional, saturated, aliphatic, polyhydric alcohol residue, said residue containing less than four carbon atoms and less than three hydroxl groups; with substantially stoichiometric amounts of an alkanolamine.

14. A water-soluble soap of an α-substituted higher fatty acid having the formula:

$$R.CH.OY$$
$$|$$
$$COOM$$

where R is an alkyl radical containing at least ten carbon atoms; and Y is a simple functional, saturated, aliphatic, polyhydric alcohol residue, said residue containing less than seven carbon atoms and less than three hydroxyl groups, and M is an alkalolamine.

15. A water-soluble soap of an α-substituted higher fatty acid having the formula:

$$R.CH.OY$$
$$|$$
$$COOM$$

where R is an alkyl radical containing at least ten carbon atoms; and Y is a simple functional, saturated, aliphatic, polyhydric alcohol residue, said residue containing less than four carbon atoms and less than three hydroxyl groups, and M is an alkalolamine.

HERBERT H. GUEST.

REFERENCES CITED

The following references are of record in the file of this patent:

UNITED STATES PATENTS

| Number | Name | Date |
|---|---|---|
| 2,109,929 | Rigby | Mar. 1, 1938 |
| 2,277,015 | Guest | Mar. 17, 1942 |
| 2,277,016 | Guest | Mar. 17, 1942 |

OTHER REFERENCES

Lowy and Harrow, "An introduction to Organic Chemistry," ed. 5, 1940, John Wiley & Sons, N. Y.

Karrer, "Organic Chemistry," N. Y. 1938.